(12) United States Patent
Morrissett et al.

(10) Patent No.: US 9,656,546 B2
(45) Date of Patent: May 23, 2017

(54) VEHICLE SHIFTER FLUID DIVERTER SYSTEM

(75) Inventors: Donald Morrissett, Gross Pointe Woods, MI (US); Robert E. Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 795 days.

(21) Appl. No.: 12/705,553

(22) Filed: Feb. 12, 2010

(65) Prior Publication Data

US 2011/0197697 A1    Aug. 18, 2011

(51) Int. Cl.
*B60K 20/00* (2006.01)
*B60K 20/02* (2006.01)
*F16H 59/02* (2006.01)

(52) U.S. Cl.
CPC ......... *B60K 20/02* (2013.01); *F16H 59/0213* (2013.01); *Y10T 74/2014* (2015.01); *Y10T 74/20104* (2015.01)

(58) Field of Classification Search
USPC ....... 74/473.3; 277/374, 375, 575, 605, 642; 137/899
See application file for complete search history.

(56) References Cited

U.S. PATENT DOCUMENTS

| | | |
|---|---|---|
| 3,285,093 A | 11/1966 | Sellmeyer |
| 4,029,324 A * | 6/1977 | Berkes .......................... 277/507 |
| 4,964,359 A | 10/1990 | Richmond |
| 5,600,185 A | 2/1997 | Hamma |
| 5,680,799 A * | 10/1997 | Nukatsuka et al. ............ 74/566 |
| 5,781,869 A | 7/1998 | Parlett, Jr. |
| 5,848,855 A * | 12/1998 | Roossien ....................... 403/329 |
| 5,979,263 A * | 11/1999 | Tomida et al. .............. 74/473.3 |
| 6,082,286 A | 7/2000 | Kovach et al. |
| 6,166,629 A | 12/2000 | Hamma |
| 6,182,530 B1 * | 2/2001 | Hattori et al. .................. 74/566 |
| 6,401,770 B1 * | 6/2002 | Eimer ............................. 141/86 |
| 6,406,103 B1 | 6/2002 | Elliott |
| 6,523,434 B2 | 2/2003 | Tsuruta et al. |
| 7,032,876 B1 * | 4/2006 | Pedersen et al. ............ 251/63.4 |
| 7,650,849 B2 * | 1/2010 | Aso et al. ..................... 116/28.1 |
| 7,874,603 B2 * | 1/2011 | Stoner ........................ 296/24.34 |
| 7,891,267 B2 * | 2/2011 | Aso et al. .................. 74/473.18 |
| 2007/0096557 A1 | 5/2007 | Tamai |
| 2007/0137363 A1 * | 6/2007 | Aso et al. .................. 74/473.18 |
| 2008/0004766 A1 | 1/2008 | Gallo |
| 2008/0015761 A1 | 1/2008 | Bellego |
| 2008/0163713 A1 | 7/2008 | Hessler |
| 2012/0011955 A1 * | 1/2012 | Hada et al. .................. 74/473.3 |
| 2012/0061921 A1 * | 3/2012 | Maskaliunas ................. 277/575 |

FOREIGN PATENT DOCUMENTS

EP     1561612 A1    8/2005

* cited by examiner

*Primary Examiner* — Zakaria Elahmadi
(74) *Attorney, Agent, or Firm* — James Dottavio; MacMillan, Sobanski & Todd, LLC

(57) ABSTRACT

The present disclosure relates to a vehicle shifter assembly having a retainer ring between a housing and an instrument panel or console. The retainer ring includes a fluid diverter system configured to guide fluid away from predetermined shifter assembly component(s).

9 Claims, 4 Drawing Sheets

VEHICLE SHIFTER FLUID DIVERTER SYSTEM

TECHNICAL FIELD

The present disclosure relates to vehicle shifters and fluid diverter systems designed to guide fluid away from predetermined shifter assembly components.

BACKGROUND

Conventional vehicles utilize a shifting device that enables a vehicle driver to shift the transmission into an intended mode of operation. Floor-mounted shifter designs can be more economical and less complex than steering-column mounted designs since they are positioned proximate to the transmission. Still, there is a need to provide cost-reduction improvements to existing shifter designs.

For example, when fluid like soda, tea or coffee is spilled onto a floor-mounted shifter the natural flow path is to spill down onto the shifter mechanism below. In some shifter assemblies, immediately below the front of the shifter is a transmission shifter interlock solenoid which allows release of the shifter from park when the brake is applied and an actuation button is depressed. Fluid spills in the passenger compartment can cause the interlock solenoid to stick and lock. When the shift interlock solenoid is locked it does not release on command and the driver can be left with their vehicle stuck in the park position and thus leaving the vehicle immobile.

Some existing floor-mounted shifter designs have sought to provide a solution to fluid spills but fall short of the present teachings. U.S. Pat. No. 5,680,799 titled "Shift Lever Device" to Nukatsuka discusses implementing a water stopper mounted to the shift lever configured to direct water into an emptied area of the shifter casing. The water stopper is configured to move with the shift lever and provides varied coverage according to the position of the shift lever. Likewise, U.S. Pat. No. 5,979,263 also titled "Shift Lever Device" discusses a mark piece portion mounted on the shift lever which acts as a light guide. Movement of the lever also moves the provided mark piece portion. More consistent fluid spill prevention methods are desirable.

Various designs incorporate a fixed-bezel housing design—including the '799 patent and '263 patent—that covers the shifter assembly components. Similarly, U.S. Pat. No. 6,182,530 titled "Shift Lever Device" discusses a drainage with elongated projections formed in a side wall of a housing. However, since the drainage is incorporated into a rigid housing near the shift lever it still only provides limited coverage to the components therebelow. If a large amount of fluid spills in an area opposite the drainage or mark piece portion, overspill onto critical components can occur. Greater coverage for spill-proofing is desirable.

Therefore, it is desirable to have a fluid diverter system that can provide more consistent and wider coverage for spill proofing. The fluid diverter system should be compatible with both hard- and soft-cover housings (such as a boot).

SUMMARY

The present invention may address one or more of the above-mentioned issues. Other features and/or advantages may become apparent from the description which follows.

One embodiment of the present invention is a vehicle shifter assembly, including: a shift lever positioned with respect to an instrument panel or console; a housing attached to the shift lever, configured to at least partially cover a predetermined shifter assembly component; and a retainer ring between the housing and the instrument panel or console. The retainer ring includes a fluid diverter system configured to guide fluid away from the predetermined shifter assembly component. The fluid diverter system comprises a channel formed in the retainer ring. The channel includes a middle portion and two end portions, a floor of the middle portion is positioned upwards of at least one of the two end portions.

Another exemplary embodiment of the present invention is a boot for a shifter assembly, including: a first end defining a first orifice in the boot configured to fit a shifter lever therethrough; a second end defining a second orifice in the boot, larger than the first orifice; and a retainer ring attached to the second end, configured to attach to a vehicle component. The retainer ring includes a fluid diverter system configured to guide fluid in a predetermined flow path.

Another exemplary embodiment of the present invention is a method of manufacturing a fluid diverter system for an instrument cluster or console mounted shifter assembly, the method includes: forming a housing configured to at least partially cover a predetermined shifter assembly component; forming a retainer ring attachable to the housing and the instrument panel or console; and forming a channel in the retainer ring.

Another exemplary embodiment of the present invention is a vehicle shifter assembly, including: a shift lever positioned with respect to an instrument panel or console; and a fluid management system configured to guide fluid away from a predetermined shifter assembly component. The system includes: a housing attached to the shift lever, configured to at least partially cover the predetermined shifter assembly component; a retainer ring between the housing and the instrument panel or console; and a channel formed in the retainer ring. The channel includes a middle portion and two end portions, a floor of the middle portion is positioned upwards of at least one of the two end portions.

One advantage of the present teachings is that they provide a fluid diverter system that can yields more consistent and wider coverage for spill proofing.

Another advantage of the fluid diverter systems is that they are compatible with both hard- and soft-cover housings (such as a boot). In arrangements having a flexible housing, such as a boot, movement of the shift lever does not alter the coverage against fluid spill.

Another advantage of the present teachings is that the diverter allows for some build variation between the console and shifter without compromising robustness to fluid spill. Any fluid that passes beyond the console trim ring will be channeled away from the solenoid.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Figure 1:
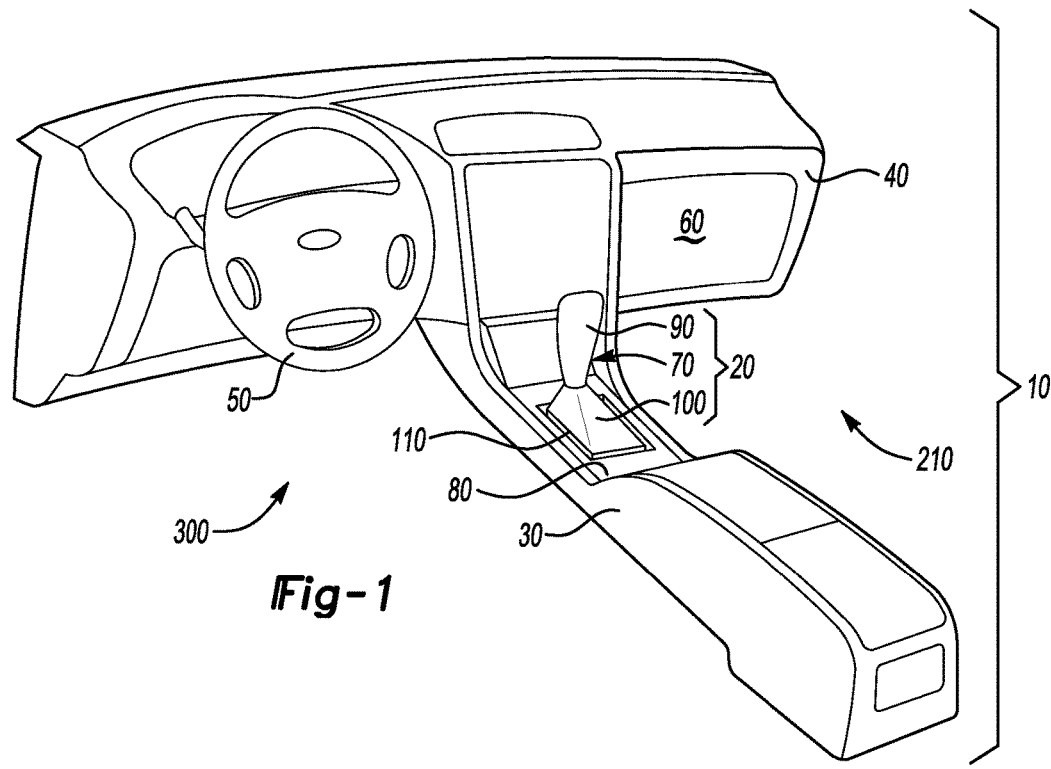
FIG. 1 is a perspective view of a vehicle interior having a floor-mounted shifter assembly in accordance with an exemplary embodiment of the present invention.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-6, wherein like characters represent the same or corresponding parts throughout the several views there are shown exemplary embodiments of various instrument-panel or console mounted shifter assemblies. Each shifter assembly is compatible with a vehicle transmission. The transmission can be any conventional transmission such as, for example, an automatic, manual, continuously variable or electrically variable transmission. Shifter assemblies enable the driver to control the mode of transmission operation. Shifter includes a user input device (e.g., a shifter lever) that is connected to various electrical and mechanical transmission components positioned below the input device. Various fluid diverter systems are incorporated into the shifter assemblies to guide fluid along a predetermined flow path and away from predetermined shifter assembly components. It can be desirable to guide fluid away from electrical shifter assembly components (e.g., switches, solenoids, capacitors, transistors, resistors, etc.). Shifter assemblies can be mounted anywhere on the vehicle floor, floor-mounted consoles, center-mounted consoles or instrument panel. Shifter assemblies are compatible with different types of vehicles including coupes, sedans, convertibles, SUVs, trucks, vans, and cross-overs.

Referring now to FIG. 1, there is shown therein a vehicle interior 10 having a shifter assembly 20 mounted to a floor console 30. The vehicle interior 10 includes an instrument panel 40. The instrument panel 40 spans the front end of a vehicle; the panel 40 includes a steering wheel 50 and storage compartment 60. The floor console 30 is attached to a floor pan of the vehicle (e.g., 120 as shown in FIG. 2).

In a front section of the floor console the shifter assembly 20 is mounted to the floor console 30. Shifter assembly 20 includes a shift lever 70 to enable a vehicle driver to change the transmission mode of operation. The front section of the console 30 includes a finish panel 80 through which the shifter lever 70 extends. In this embodiment, shifter assembly 20 is for a manual transmission. At the exposed end, shift lever 70 includes a shift knob 90. The shifter assembly 20 includes a housing 100 attached to the shift lever 70. In the shown embodiment, housing 100 is a boot composed of a fluid resistant material. Housing 100 is attached to the console 30 through a retainer ring. Retainer ring 110 is positioned between the housing 100 and the console 30. Retainer ring 110 includes a fluid diverter system (as discussed below) to mitigate fluid spill.

Figure 2:
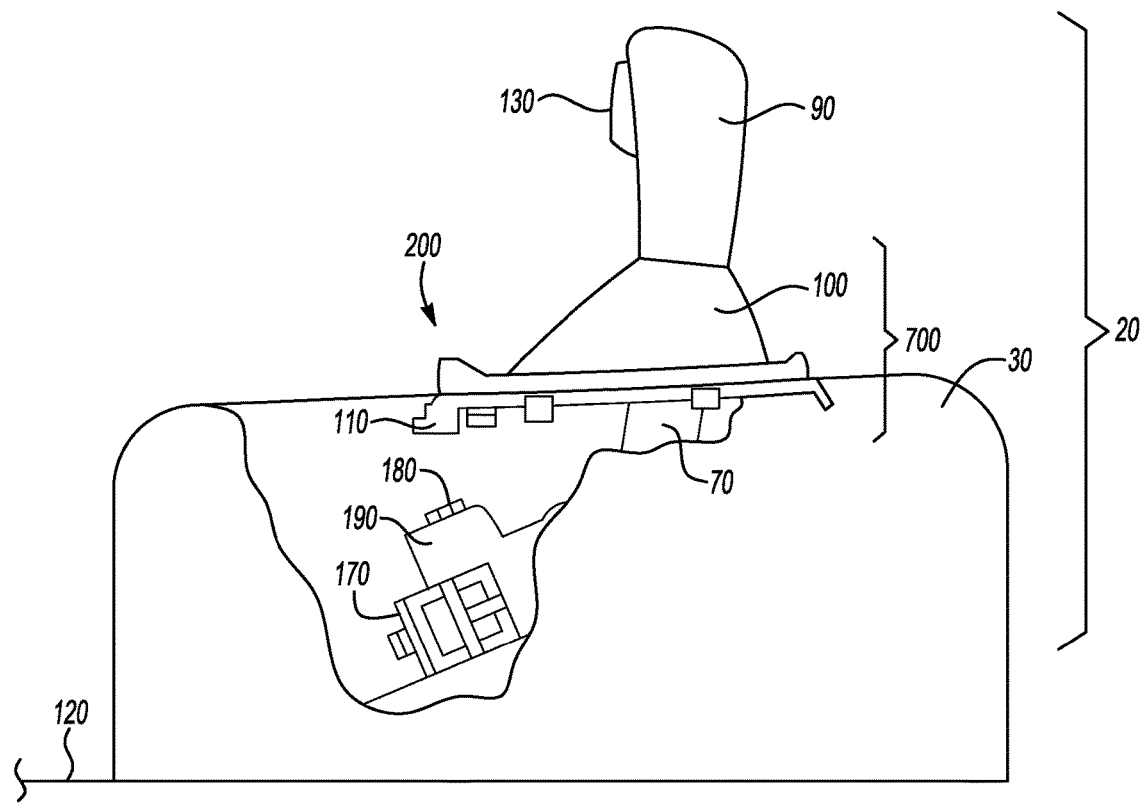
FIG. 2 is a side view of the floor shifter assembly of FIG. 1.

Referring now to FIG. 2, there is shown therein the center console 30 of FIG. 1. The center console 30 is attached to a vehicle floor pan 120. The shifter assembly 20 is mounted to the center console 30. The shifter assembly 20 includes the knob 90 and an overdrive button 130 to selectively shift the transmission out of drive and over-drive. The knob 90 covers the shifter lever 70.

Figure 3:
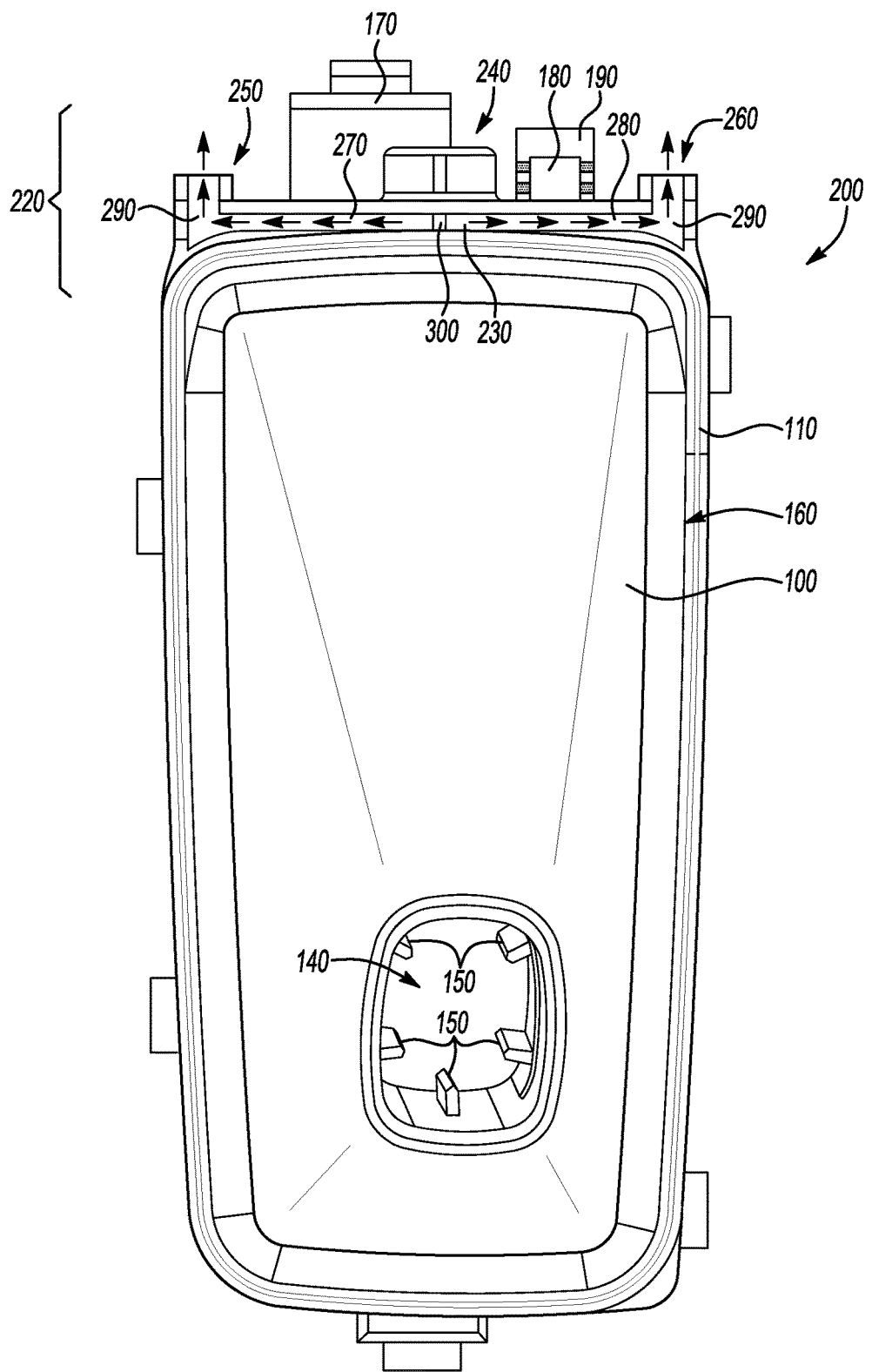
FIG. 3 is a top view of a housing and retainer ring of FIG. 2.

Housing 100, as shown in FIG. 2, is attached to the shift lever 70 below the knob 90. The housing 100 is a boot or canopy that covers a portion of the shift lever 70 and other shifter assembly components therebelow. Housing 100 is made of a flexible material and configured to move with the shifter lever 70 while maintaining a consistent coverage of shifter assembly components. Housing 100 defines an orifice 140, as shown in FIG. 3, configured to fit the shifter lever 70 therethrough. Housing 100 is attached to the shifter lever 70 through snap-fit attachments (150 as shown in FIG. 3). Housing 100 defines another orifice 160 (larger than orifice 140). The retainer ring 110 is attached to an end of the housing 100 defining orifice 160.

Housing 100, as shown in FIG. 2, is composed of a fluid-resistant material such as leather or a polymer. The retainer ring 110 holds the housing 100 in place to the console finish panel 80. The leather is glued to the ring 110 and the ring is snapped into the underside of the top finish panel 80. Retainer ring 110 can be affixed to housing 100 using glue or other known attachment schemes. Retainer ring 110 is composed of a hard plastic. Retainer ring 110 can also be composed of a metal, wood or other material. In this embodiment, retainer ring 110 is injection molded. Retainer ring 110 can also be stamped, lathed or formed using various other techniques.

A partial cut-away of the console 30, as illustrated in FIG. 2, shows components of the shifter assembly. In the illustrated embodiment, two exemplary electric shifter assembly components are shown. A transmission shifter interlock solenoid 170 and a transmission lever position detection switch 180 are shown. The transmission shifter interlock solenoid 170 is a solenoid located in a front section of the console 30. The solenoid 170 is configured to unlock the shifter assembly 20 when a brake pedal (not shown) is applied and shifting out of park is desirable. The solenoid 170 is positioned below the front end of the retainer ring 110 and along the middle of the retainer ring.

The transmission lever position detection switch 180, as shown in FIG. 2, is attached to a circuit board 190 located under the front section 200 of the retainer ring 110. The switch 180 is positioned off-center the retainer ring 110 and towards a passenger side of the vehicle interior (e.g., 210 as shown in FIG. 1). The position detection switch 180 provides two electrical signals: 1) indicating that the driver has placed the gear shift in park and has released an actuator button; and 2) completing the circuit to the key lock solenoid, permitting key removal when the shift lever is in the park position.

Retainer ring 110 includes a fluid diverter system 220 formed therein as shown in FIG. 3. FIG. 3 is a top view of the housing 100 and retainer ring 110 of FIG. 2. The fluid diverter system 220 includes a channel 230 formed in the retainer ring 110. Channel 230 extends horizontally along the front portion 200 of the retainer ring 110. The channel 230 includes a middle section 240 and two end sections 250, 260. Middle section 240 sits at an upward position with respect to the two end sections 250, 260. In this manner, channel 230 includes two inclined surfaces 270, 280. Fluid is guided downward and outward with respect to the front end 200 of the retainer ring 110.

The fluid diverter system 220 is configured to direct fluid into a predetermined flow path (as indicated by the flow arrows drawn in FIG. 3). The diverter system 220 includes a fluid run-off 290 at each end 250, 260 of the channel 230. Fluid that trickles down from the housing 100 is routed away from the center of the retainer ring 110 and towards ends end 250 and 260 of the retainer ring 110. A divider 300 is included in the channel 230 to adjust the flow path of fluid therethrough. In this manner, electric shifter assembly components located near the center of the retainer ring can avoid fluid spill. In this embodiment, the fluid diverter system 220 is developed to route spilled fluid away from the shift interlock solenoid 170 and position detection switch 180, thus keeping the solenoid and switch free to actuate on command from the driver.

The diverter system 220 is molded in the retainer ring 110 which channels fluid off towards the side of the boot opening or orifice 160. Alternative designs allow for the diverter system 220 be a stamped or a bolted-on component.

Figure 4:
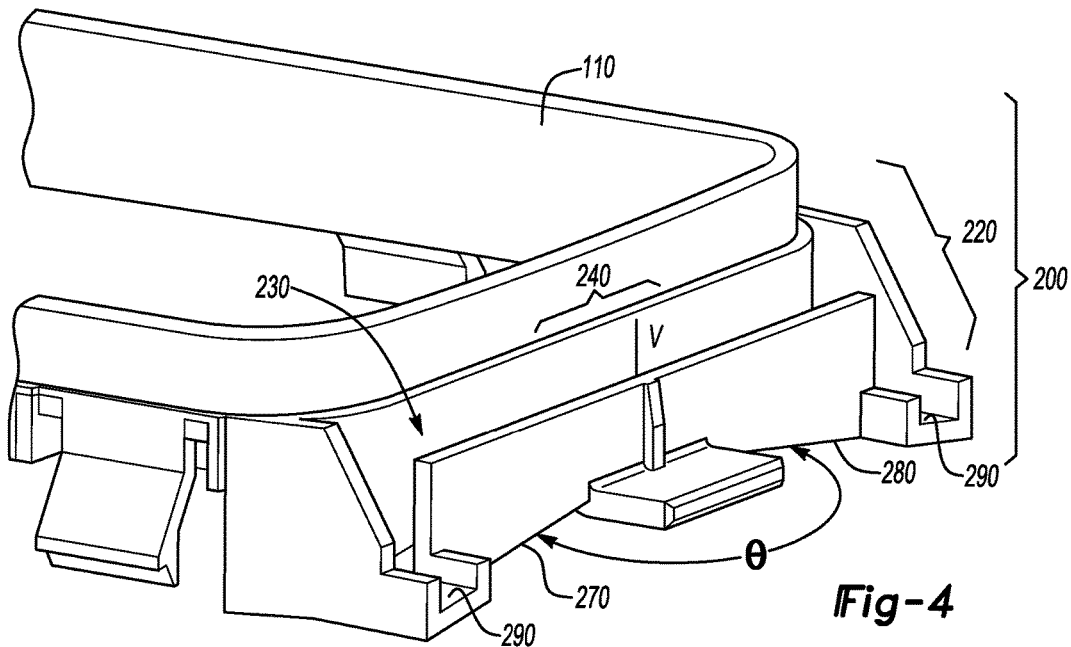
FIG. 4 is a perspective view of the retainer ring of FIG. 2.

Referring now to FIG. 4, there is shown therein a perspective view of the front section 200 of the retainer ring 110. As shown, channel extends across the front portion of the retainer ring. Channel 230 includes two inclined surfaces 270, 280 that meet in the center of middle portion 240. Inclined surfaces 270, 280 form an angle, Θ. In the shown embodiment, the inclined surfaces are separated by a 170 degree angle. Fluid is guided downward and outward with respect to the front end 200 of the retainer ring 110 according to the slope of the inclined surfaces 270, 280. In other embodiments, inclined surfaces 270, 280 are separated by an angle less than or greater than 170 degrees. Each inclined surface 270, 280 can have a different slope. For example, surface 270 can be angled 80 degrees from a vertical axis, V, while surface 280 is angled 90 degrees therefrom.

Two fluid run-offs 290 are included in the fluid diverter system 220, as shown in FIG. 4, at each end 250, 260 of the retainer ring 110. Run-offs 290 are positioned perpendicularly with respect to the middle section 240 of the channel 230. Run-offs 290 are inclined with respect to the vertical axis, V. In the illustrated embodiment, run-offs 290 are angled with respect to the middle section 240.

In other embodiments, the fluid diverter system 220 is configured to guide fluid along a different flow path. For example, in one embodiment fluid diverter system 220 is configured to guide fluid toward the driver side of the retainer ring (e.g., 300 as shown in FIG. 1). Fluid diverter system includes a channel that extends horizontally across a front end of the retainer ring. A fluid run off is located at a front, driver side corner of the retainer ring. The channel can include an inclined surface to further guide fluid toward the intended corner. In this embodiment, the shifter assembly includes electric shifter assembly components located on the front passenger side of the retainer ring. The fluid diverter system routes spilled fluids away from these components. Components can be for example a transmission lever position detection switch, solenoid or park pawl.

Figure 5:
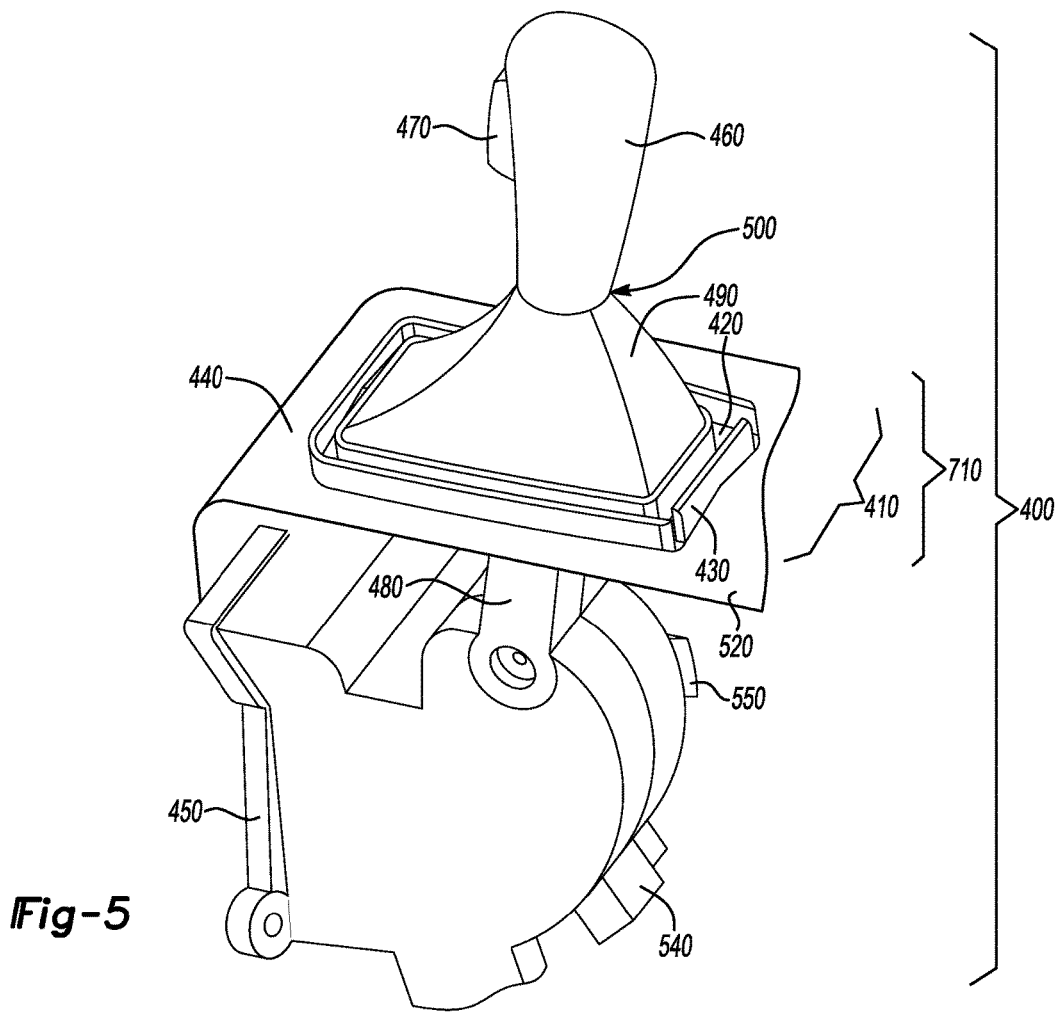
FIG. 5 is a perspective view of an instrument cluster mounted shifter assembly according to another exemplary embodiment of the present invention.

Referring now to FIG. 5, there is shown therein another exemplary embodiment of a shifter assembly 400 with fluid diverter system 410. The fluid diverter system 410 includes a channel 420 extended around the entire perimeter of a boot retainer ring 430. This system 410 manages fluid around the perimeter of the shifter assembly 410.

As shown in FIG. 5, the shifter assembly 400 is mounted to an instrument panel 440 through bracket 450. The shifter assembly 400 includes a knob 460 and overdrive button 470 to selectively shift the transmission out of drive and overdrive. The knob 460 covers a shifter lever 480. A housing 490, as shown in FIG. 5, is attached to the shift lever 480 below the knob 460.

Figure 6:
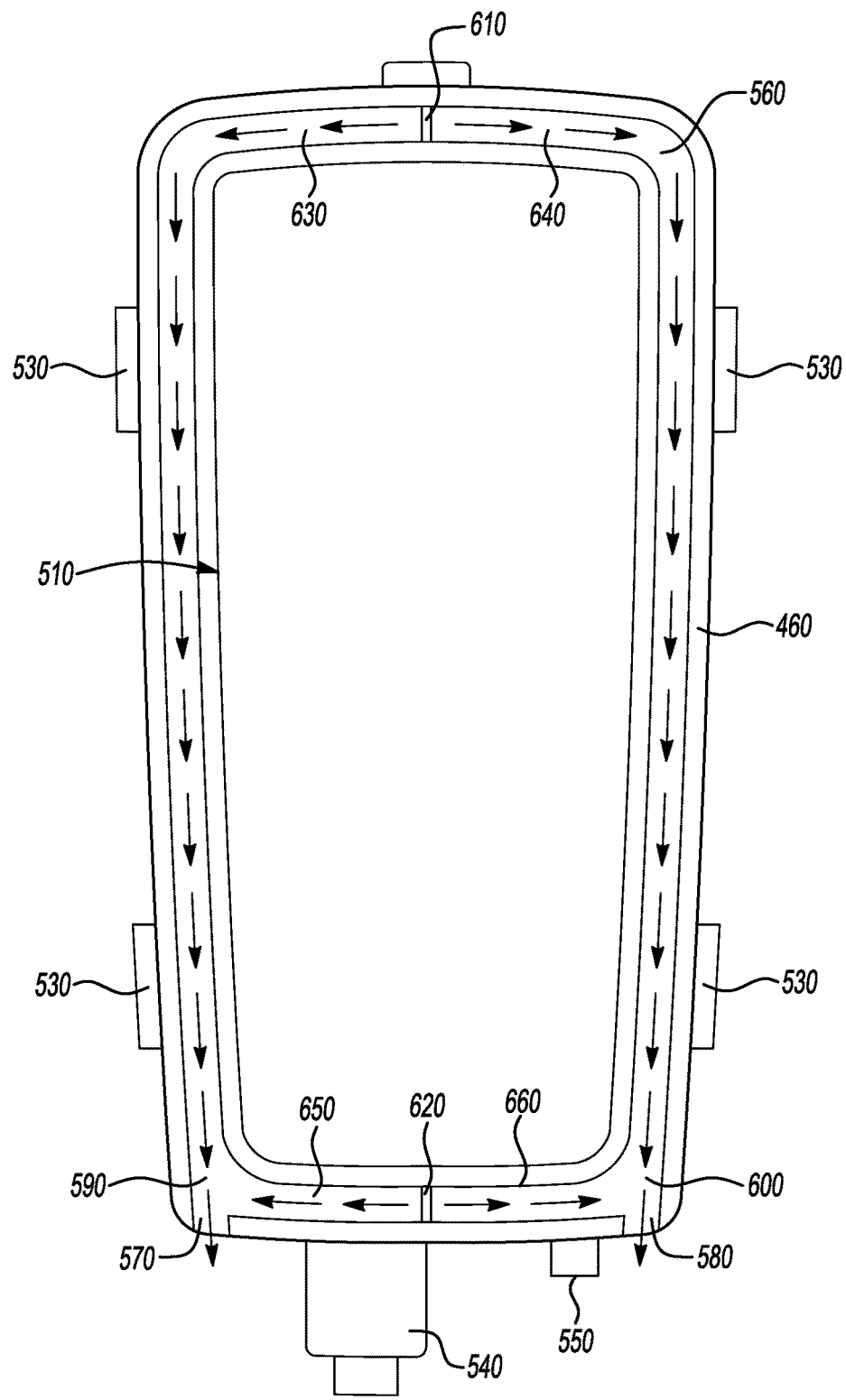
FIG. 6 is a top view of a retainer ring of FIG. 5.

Housing 490 defines an orifice 500 configured to fit the shifter lever 480 therethrough. The housing 490 is a boot or canopy that covers a portion of the shift lever 480 and other shifter assembly components therebelow. Housing 490 is made of a flexible material and configured to move with the shifter lever 480 while maintaining a consistent coverage of shifter assembly components. Housing 490 is composed of a fluid-resistant material such as leather or a polymer. Housing 490 also defines another orifice 510, larger than orifice 500. A retainer ring 430 is attached to an end of the housing 490 at orifice 510. The retainer ring 430 holds the boot 490 in place to a console finish panel 520. The leather is glued to the ring 430 and the ring is snapped into the underside of the top finish panel 520. Retainer ring 430 includes a number of press-fit attachment features (e.g., 530 as shown in FIG. 6) that secure the retainer ring to the console 440. In other embodiments, retainer ring 430 is attached to the console 440 using other methods (e.g., gluing, riveting, press-fitting or welding). Retainer ring 430 is composed of a hard plastic. Retainer ring 430 can also be composed of a metal, wood or other material.

A partial cut-away is illustrated in the instrument panel 440, in FIG. 5, showing components of the shifter assembly 400. In the illustrated embodiment, a transmission shifter interlock solenoid 540 and a transmission lever position detection switch 550 are shown. The transmission shifter interlock solenoid 540 is a solenoid located in a rear section of the instrument panel. The solenoid 540 is positioned below the rear end of the retainer ring 430 and along the middle of the retainer ring. The transmission lever position detection switch 550, as shown in FIG. 5, is located under the rear section of the retainer ring 430. The switch 550 is positioned off-center the retainer ring 430 and towards a passenger side of the vehicle interior (e.g., 210 as shown in FIG. 1).

Retainer ring 430 includes a fluid diverter system 410 formed therein as shown in FIG. 6. FIG. 6 is a top view of the retainer ring 430 of FIG. 5. The fluid diverter system 410 includes a channel 560 formed in the retainer ring 430. Channel 560 extends entirely around the perimeter of the retainer ring 430. The shifter assembly 400 sits on an angled surface of the instrument panel 440 which assists in guiding fluid toward the rear section of the retainer ring 430.

The fluid diverter system 410 is configured to direct fluid into a predetermined flow path, as shown through the arrows in FIG. 6. The diverter system 410 includes a fluid run-off 570, 580 at two ends of the channel 590 and 600, respectively. Fluid that trickles down from the housing 490 is routed away from the center of the retainer ring 430 and towards end 590 and end 600. Two dividers 610, 620 are included in the channel 560 to adjust the flow path of fluid therethrough. In this manner, electric shifter assembly components located near the center of the retainer ring 430 can avoid fluid spill. In this embodiment, the fluid diverter 410 is developed to route spilled fluid away from the shift interlock solenoid and position detection switch, thus keeping the solenoid and switch free to actuate on command from the customer.

Referring to FIG. 6, there is shown two fluid run-offs 570, 580 included in the fluid diverter system 410 at each end of the retainer ring. Channel includes four inclined surfaces 630, 640, 650 and 660 that are angled with respect to center sections located at the front and rear sides of the channel. Divider 610 is included in the front end of channel 420. Divider 620 is also included in rear end of channel 420.

The shifter assemblies 20 and 400 of FIGS. 1-6 include overall fluid management systems 700 and 710 configured to guide fluid away from predetermined shifter assembly component(s). Fluid management systems 700 and 710 are compatible with a shift lever positioned with respect to an instrument panel or console (e.g., 70 and 480). The fluid management system 700 and 710 includes a housing attached to the shift lever, configured to at least partially cover the predetermined shifter assembly component. Exemplary housings are 100 and 490 as shown in FIGS. 1-6. Housing acts in concert with retainer rings—e.g., 110 and 430—and fluid diverter systems —220 and 410—incorporated in the retainer rings to guide water away from shifter assembly components. The distance provided between the shift lever and fluid diverter system yields greater coverage area against spill. Housing have a flexible design, e.g., a boot mounted so that movement of the shift lever does not adjust the coverage against fluid spill to components below. The flexible housing designs create greater and more consistent coverage. Channels 230 and 420 are exemplary channels for retainer rings.

A method of manufacturing a fluid diverter system for an instrument cluster or console mounted shifter assembly is also included with the present teachings. The method includes: forming a housing configured to at least partially cover a predetermined shifter assembly component; forming a retainer ring attachable to the housing and the instrument panel or console; and forming a channel in the retainer ring. The forming of the retainer ring and channel can be performed via molding. The method further includes forming a fluid run-off in at least one end of the channel. The fluid run-offs can be included in the mold or stamped in a later forming process. In some embodiments, the method of manufacture also includes forming an inclined surface in the channel. Channel can be included in any molds, stamped, carved or otherwise formed in the retainer ring.

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A vehicle shifter assembly, comprising:
   a shift lever mounted on a console;
   a housing attached to the shift lever, covering a shifter assembly component;
   a retainer ring for attaching the housing to the console, including at a forward end a lateral channel that includes first and second portions, each portion sloping downward and in mutually opposite lateral directions from a divider in the channel to respective first and second forward-directed run-offs.

2. The assembly of claim 1, wherein the housing is a boot.

3. The assembly of claim 2, wherein the housing is at least partially composed of a fluid resistant material.

4. The assembly of claim 1, wherein the channel is molded into the retainer ring.

5. The assembly of claim 1, wherein each run-off is formed in a lateral end of each of the channel.

6. The assembly of claim 1, wherein the channel extends around a perimeter of the retainer ring.

7. The assembly of claim 1, wherein the predetermined shifter assembly component is one of a transmission shifter interlock solenoid and a transmission lever position detection switch.

8. A vehicle shifter assembly, comprising:
   a shift lever mounted on a console;
   a housing attached to the shift lever;
   a retainer ring attaching the housing to the console, including a lateral channel having first and second portions defined by dividers, each portion sloping downward in mutually opposite lateral directions at forward and rearward ends of the channel, downward and rearward along opposite lateral sides of the channel, to respective first and second rearward-directed run-offs.

9. The shifter assembly of claim 8 wherein the dividers include a first divider located in a lateral length of the channel at a forward end of the channel, and a second divider located in a lateral length of the channel at a forward end of the channel.

* * * * *